June 17, 1947.　　M. WATTER ET AL　　2,422,452
ENGINE MOUNT
Filed April 30, 1943　　7 Sheets-Sheet 1
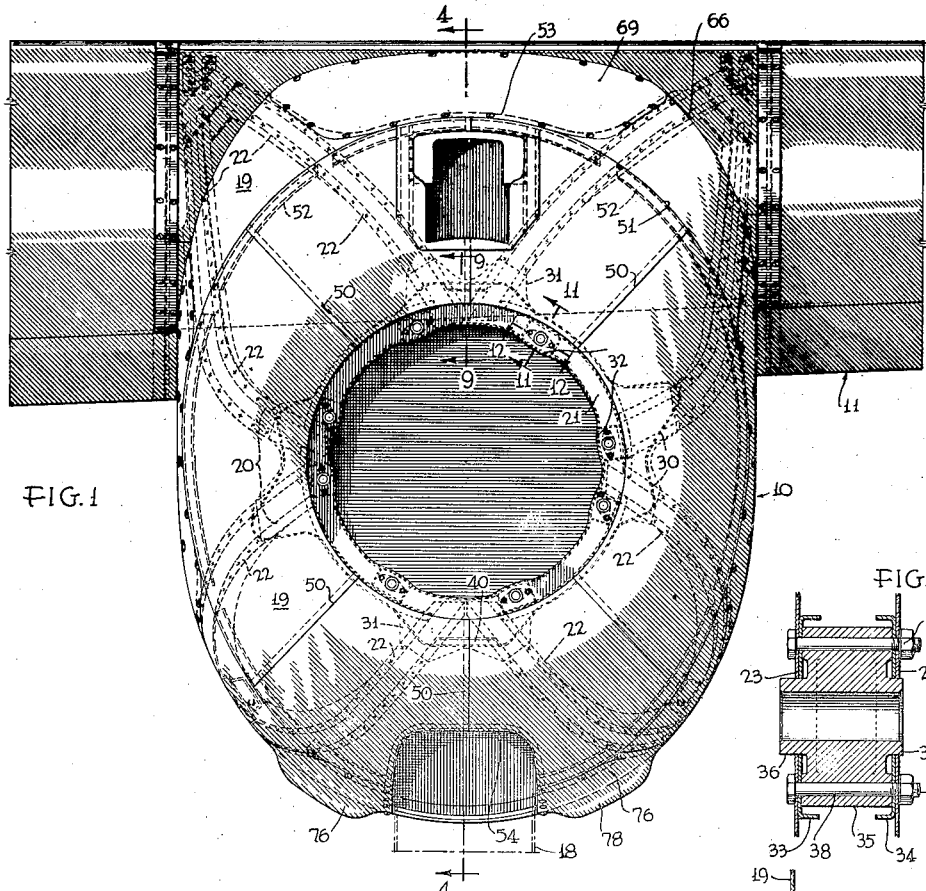
FIG. 1
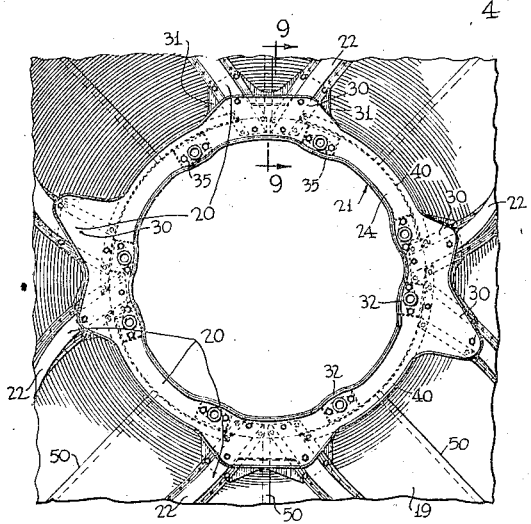
FIG. 8
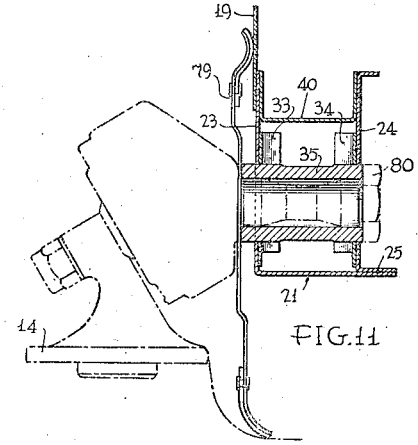
FIG. 12
FIG. 11
INVENTORS.
Michael Watter
George W. Pancoe
BY John P. Bishop
ATTORNEY June 17, 1947.  M. WATTER ET AL  2,422,452
ENGINE MOUNT
Filed April 30, 1943  7 Sheets-Sheet 2
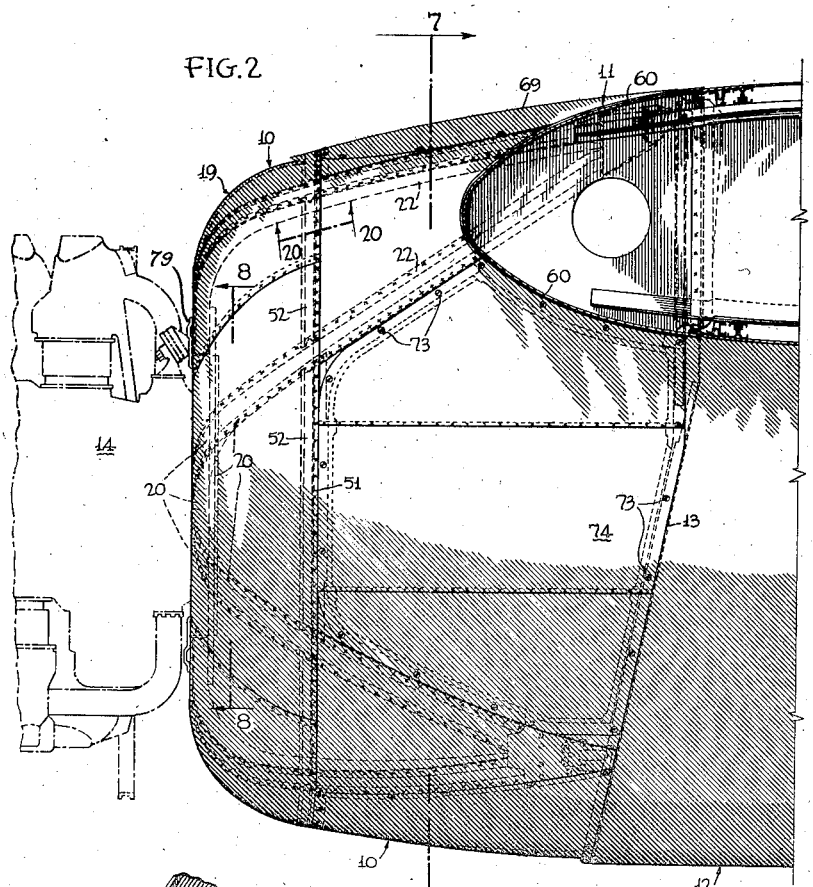
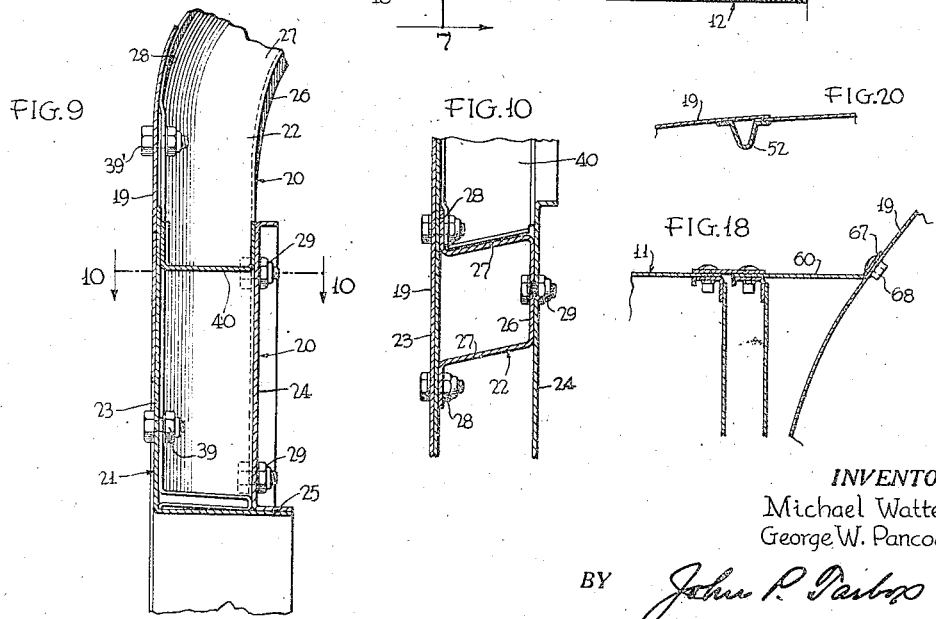
INVENTORS.
Michael Watter
George W. Pancoe
BY
ATTORNEY

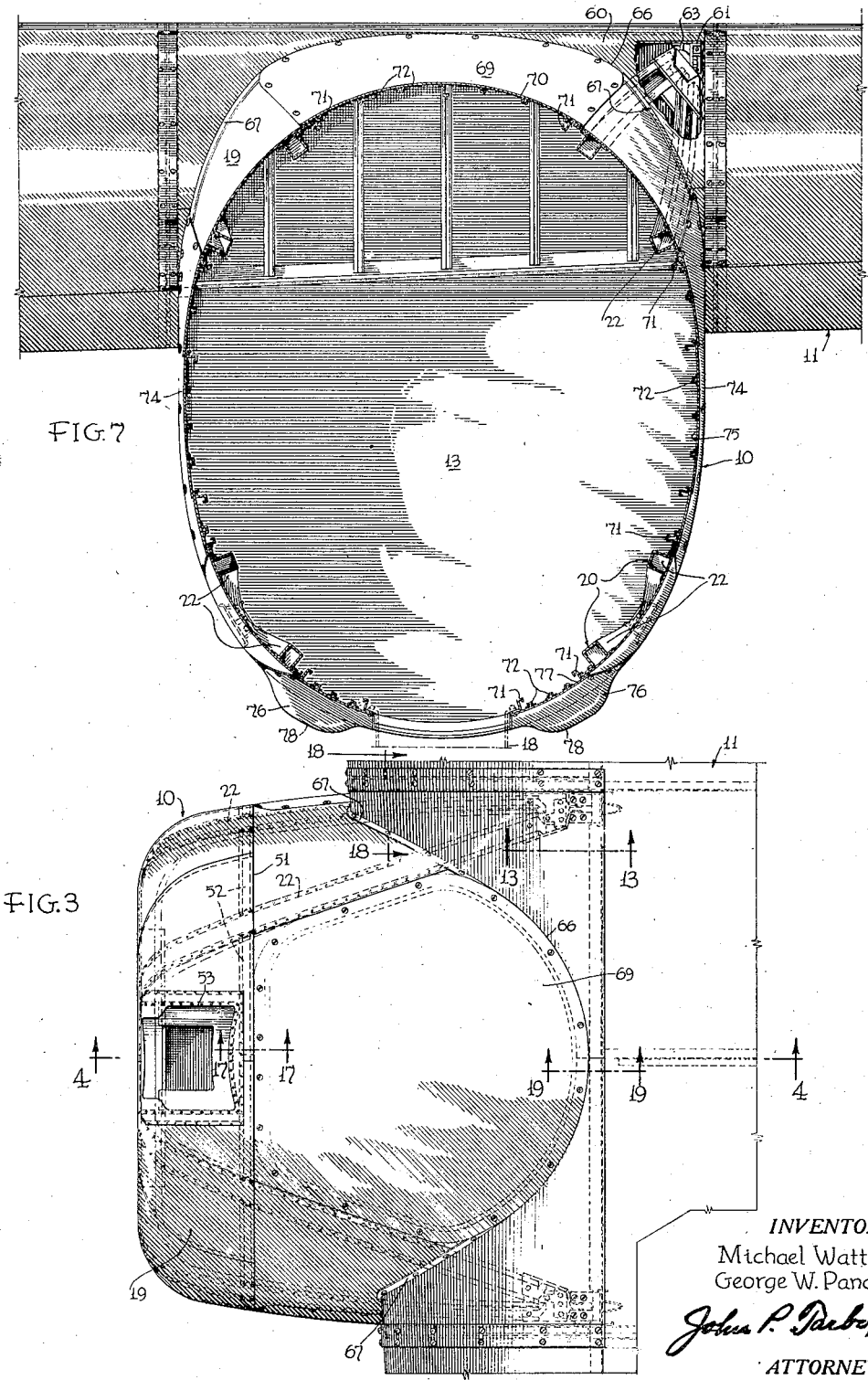

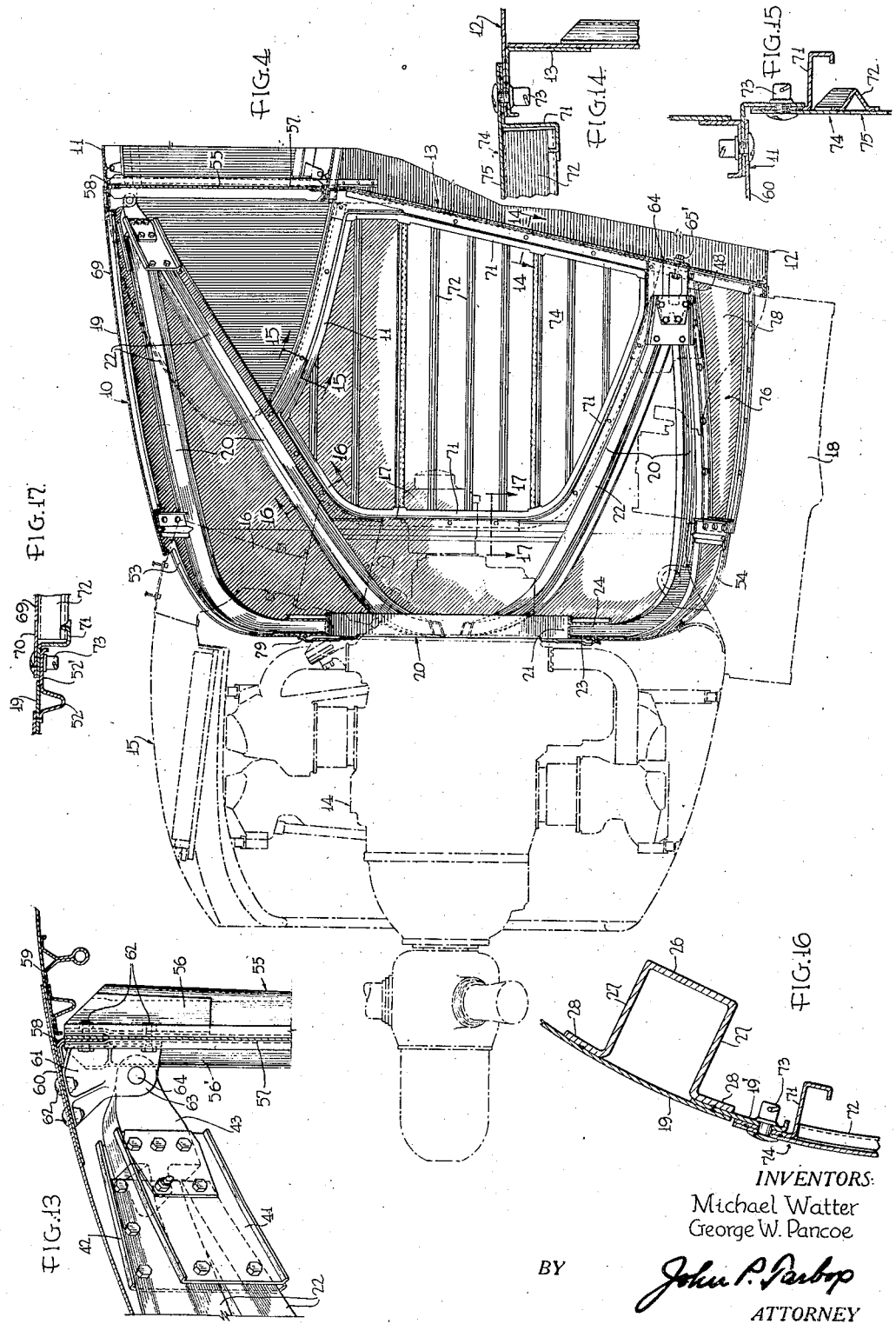

June 17, 1947.　　M. WATTER ET AL　　2,422,452
ENGINE MOUNT
Filed April 30, 1943　　7 Sheets-Sheet 5
FIG.5
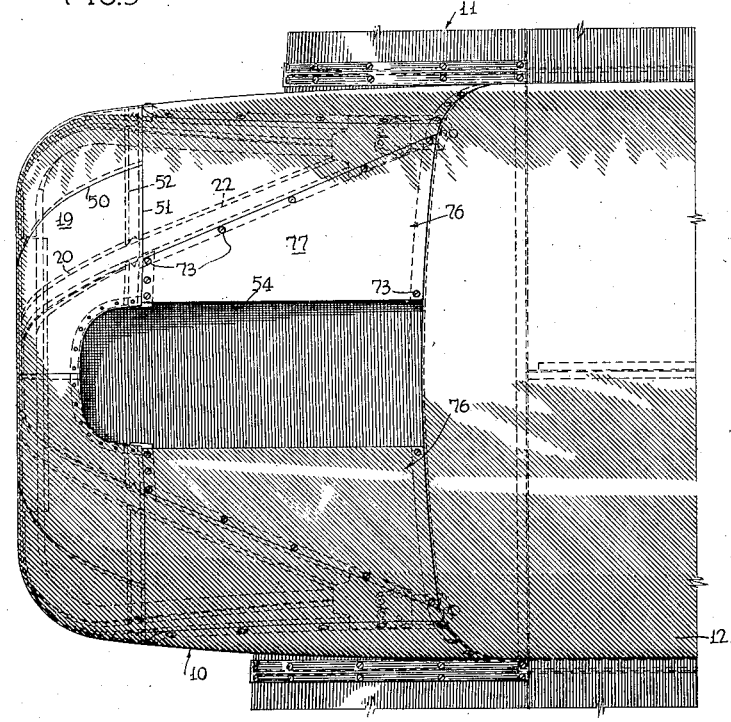
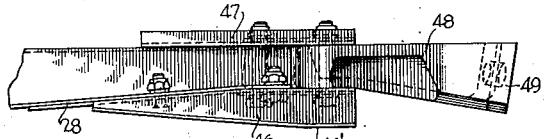
FIG.26
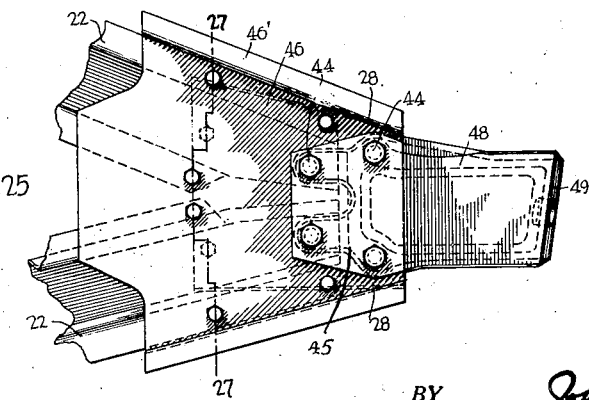
FIG.25
INVENTORS:
Michael Watter
George W. Pancoe
BY
ATTORNEY

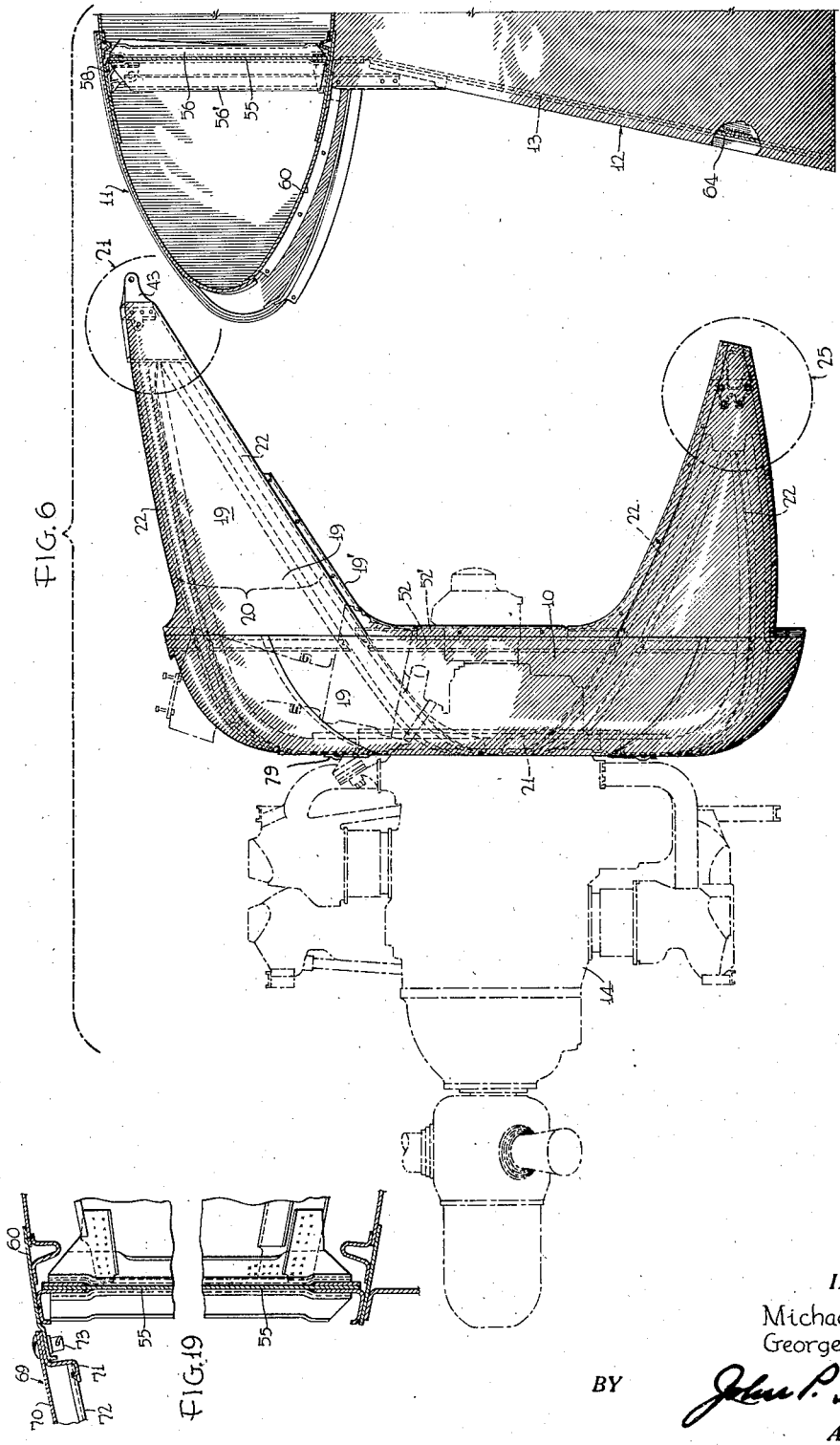

June 17, 1947.   M. WATTER ET AL   2,422,452
ENGINE MOUNT
Filed April 30, 1943   7 Sheets-Sheet 7
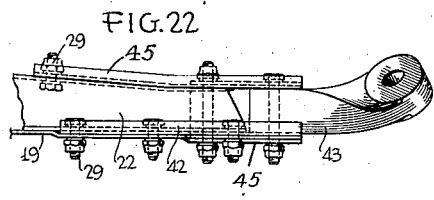
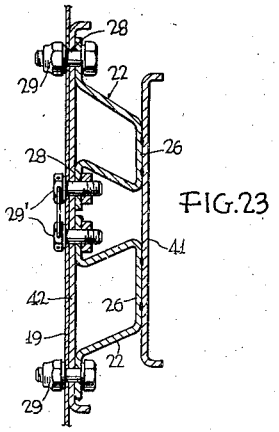
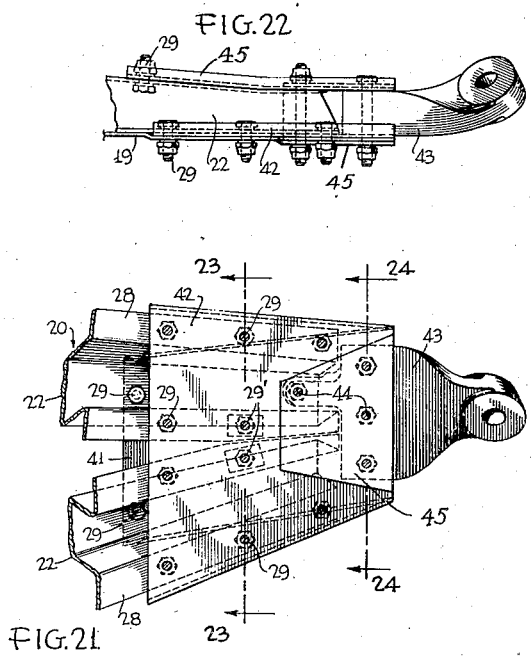
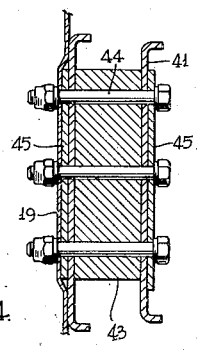
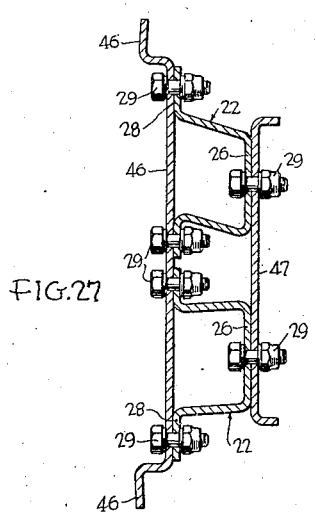
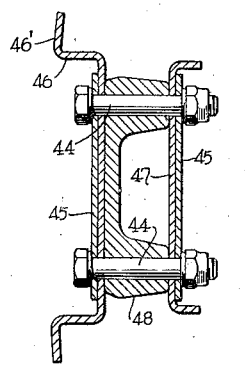
INVENTORS.
Michael Watter
George W. Pancoe.
BY *John P. Jarbox*
ATTORNEY Patented June 17, 1947

2,422,452

UNITED STATES PATENT OFFICE 2,422,452

ENGINE MOUNT

Michael Watter and George W. Pancoe, Philadelphia, Pa., assignors to The Budd Company, Philadelphia, Pa., a corporation of Pennsylvania Application April 30, 1943, Serial No. 485,100

13 Claims. (Cl. 244—54)

1

The invention relates to an engine mount and particularly to such a mount in which the engine is supported in cantilever fashion from a transverse bulkhead of the stream-line fuselage or nacelle of an airplane.

In such mounts, it has heretofore been the general practice to secure the engine to a separate frame made of steel tubing or the like, the radial dimensions of which tapered inwardly on generally rectilinear lines to a mounting ring at the outer end of the mount, and, to make this region occupied by the mount of a stream-line contour merging with the body with which the mount is associated, such as an airplane fuselage or nacelle, it has been the practice to provide a separate stream-line cowling covering the engine mount, such cowling being adapted to house the mount and engine accessories. Wtih such an arrangement the space within the cowling was broken up by the engine mount framing, which interfered to an appreciable extent with the disposition of the engine accessories and with their accessibility.

It is among the objects of the invention to provide a cleaner overall arrangement, to simplify the engine mount and accessory cowling structures and to lighten the weight of the overall structure. To attain these objects, the engine mount and the accessory cowl are combined into a unitary structure so that the stream-line skin of the cowling forms a stress-carrying structure of the mount. By organizing the combined mount and cowling as a monocoque or semi-monocoque structure, adequate strength is attained with minimum weight, since the skin and internal reinforcements are so arranged as to mutually reinforce and brace each other. Light weight is further attained by making substantially the entire combined mount and cowling structure out of sheet metal and by proper combination of the inner reinforcing framework with the skin so as to form therewith box-section structures stiff against bending and torsion. By utilizing high-tensile sheet metal, such as 18 and 8 stainless steel, the advantages of the invention are realized in highest degree.

The monocoque or semi-monocoque construction leaves a large unobstructed space within the combined mount and cowl providing adequate room to arrange the engine accessories therein in a way so as to provide maximum accessibility thereto. Additionally, to make such accessories readily accessible at all times large openings are provided in the sides, top and bottom of the mount, which are normally closed by readily removable doors which normally conform to the stream-line contour of the mount and to the adjoining body with which it is associated.

The invention also facilitates the assembly of the mount, the engine and its accessories as a unit, and its mounting as a unit on the airplane. This speeds up, not only the original building of the unit but the easy replacement of a unit in need of repair or overhauling by a preassembled unit.

Other and further objects and advantages and the means by which they are attained will become clear from the following detailed description when read in connection with the drawings forming a part of this specification.

In the drawings:

Fig. 1 is front elevational view of the novel combined engine mount and accessory cowl, showing its relation to the airplane wing upon which it is mounted.

Fig. 2 is a side elevational view of the mount, the associated wing being shown in section and a portion of the engine being shown in dot and dash lines and in secured relation to the mount.

Fig. 3 is a top plan view of the mount and adjacent portions of the wing.

Fig. 4 is a central vertical longitudinal sectional view, along the line 4—4 of Figs. 1 and 3, of the mount and a portion of the wing and nacelle by which it is carried, other elements associated with the mount, such as the engine, engine cowl and certain of the engine accessories being shown in dot and dash lines.

Fig. 5 is a bottom plan view of the mount, together with adjacent portions of the wing and nacelle.

Fig. 6 is an exploded view showing the leading edge portion of the wing in section and the nacelle and engine mount in side elevation, with the engine shown in place on the mount as indicated by the dot and dash lines; the engine mount being shown stripped of the doors closing the sides, top and bottom of the accessory compartment formed thereby when mounted in place on the wing and nacelle.

Fig. 7 is a transverse sectional view through the mount, the section being taken substantially on the line 7—7 of Fig. 2.

Fig. 8 is a fragmentary view of the outer end portion of the mount looking from the inside substantially along the line 8—8 of Fig. 2.

Fig. 9 is an enlarged fragmentary sectional view taken substantially along the line 9—9 of Figs. 1 and 8.

Fig. 10 is a similar view taken substantially along the line 10—10 of Fig. 9.

Figs. 11 and 12 are enlarged detail sectional views taken respectively along the lines 11—11 and 12—12 of Fig. 1.

Fig. 13 is an enlarged fragmentary detail sectional view in the region of top of the wing spar, showing the connection of the top of the mount thereto; the plane of section being indicated by the line 13—13 of Fig. 3.

Figs. 14, 15 and 16 are detail sectional views taken, respectively, along the lines 14—14, 15—15 and 16—16 of Fig. 4.

Figs. 17, 18 and 19 are detail sectional views taken, respectively, on the lines 17—17, 18—18 and 19—19 of Fig. 3, the section along the line 17—17 of Fig. 4 also corresponding to the view in Fig. 17.

Fig. 20 is a detail sectional view taken substantially along the line 20—20 of Fig. 2.

Fig. 21 is an enlarged view of the adjacent top attachment fitting of the mount as indicated by the circle 21 of Fig. 6, the skin sheathing having been omitted.

Fig. 22 is a top plan view of the fitting of Fig. 21, with the skin sheathing in place.

Figs. 23 and 24 are sectional views, as indicated, respectively, by the lines 22—22 and 23—23 of Fig. 21.

Figs. 25 and 26 are views similar to Figs. 21 and 22 of the adjacent bottom fitting shown within the circle of Fig. 6, and Figs. 27 and 28 are sectional views thereof, as indicated, respectively, by the lines 27—27 and 28—28 of Fig. 25.

In the drawings, the invention is shown applied to the front end of a nacelle supported from and faired into a wing of an airplane of the type having the engines mounted on the wings, but the broad features of the invention are applicable to any cantilever-type engine mount combined with an accessory cowl and adapted to be mounted in stream-line continuation of a stream-line body, such as fuselage, nacelle or the like.

Referring now to the embodiment shown, the combined engine mount and accessory cowl is designated generally by the numeral 10, the wing, by 11, the nacelle, by 12, the bulkhead or firewall to which the mount is secured, by 13, the engine, by 14, and the engine cowling by 15. Only a few of the engine accessories are shown disposed partly or wholly within the mount and accessory cowl shell, these being the carburetor and intake 16, the magnetos 17, and the oil cooler 18, but it will be understood that most of the space within the shell is occupied by these and other accessories, which are merely indicated in outline in dot and dash lines or entirely omitted for the sake of clearness of disclosure of the mount per se.

As clearly appears in the drawings, the mount 10 comprises a stream-line shell generally conforming in its body to the stream-lines of the nacelle 12 but turned in at its forward end through a curve of substantial radius to an opening adapted to receive therethrough the casing of engine 14. This shell is comprised of an outer smooth metal skin sheathing 19 and an inner reinforcing spider-like framing 20 lying against and secured to the skin sheet.

As shown in Figs. 1, 2 and 4, the inner reinforcing frame spider comprises a front ring 21 and generally rearwardly extending arms 22, each of substantially the shape of a hockey stick, having a forward inwardly bent portion secured to the ring 21 and a main body portion extending rearwardly to its connection with the firewall bulkhead 13. To concentrate the loads at the four points of connection to the firewall and to distribute the reinforcing effect of the spider frame 20 circumferentially over the curved front portion of the shell, eight such arms 22 have been provided, arranged in pairs, each pair converging at their rear ends to a point of connection at the firewall and the adjacent arms of adjacent pairs converging at the front to their points of securement to the ring 21. This results in the arms 22 being connected in pairs to the top, sides, and bottom of the ring 21, as is clearly shown in Figs. 1 and 8.

As clearly appears in Figs. 9, 10 and 11, the ring 21 is comprised of an angle-section front face plate 23 and a shallow channel-section rear face plate 24 welded together through their overlapping inner arms at 25 to together form a radially outwardly facing channel adapted to receive, in telescoping relation therewith, the generally radially extending front ends of the arms 22. The arms 22 each comprise an outwardly facing channel having a bottom wall 26, side walls 27 and edge flanges 28.

Before the assembly of the front face plate 23 with the rear plate 24, the bottom walls 26 of the channel-section arms 22 are strongly secured to the rear plate 24 in their overlapping region by spot welding and additionally by a pair of spaced bolts 29 having suitable self-locking nuts. In the regions of securement of the arms 22, the rear plate 24 is provided with radial projections 30, see Fig. 8, so as to obtain a wider overlap and a stronger joint between the parts. Similarly and for a like purpose, the front plate 23 is provided with radial projections 31.

At the points where the engine 14 is bolted to the ring 21, the ring is radially widened by inwardly extending bulges as 32, see Figs. 1 and 8, and as shown in Figs. 11 and 12, in these regions the front and rear plates 23 and 24 are provided with reinforcing plates 33 and 34 spot welded to their inner faces. Between these reinforcing plates is arranged a mounting block 35 having bosses 36 and 37 projecting through aligned holes in the front and rear plates, the bosses and the body of the block between them being perforated by a bolt hole to receive an engine securing bolt 80 (see Fig. 11). The block 35 is bolted to the front and rear plates 23 and 24 by a pair of bolts 38 arranged on opposite sides of the engine securing bolt hole therein.

The arms 22 extend substantially to the bottom of the channel formed by the front and rear plates 23 and 24 in most cases, but in the case of two arms located at diametrically opposite sides of the ring (see Fig. 8), the mounting blocks 35 interfere with this. In the case of these two arms, they terminate radially outwardly of the mounting blocks in line with them, and, to secure an equally strong connection of these two arms to the ring 21, the radial projections 30 and 31 on the respective plates are extended outwardly some distance beyond the remaining projections 30 and 31.

After the arms 22 have been secured to the rear face plate 24 and the mounting blocks 25 located in place, the front face plate 23 is brought into position overlapping the outer lateral flanges 28 of the channels of the arms 22 and secured thereto, as by spot welding in the overlaps. At this time also, the inner ends of the flanges 28 may be secured to the front plate 23 additionally by bolts, as 39, and the welded joinder between the plates 23 and 24 is effected at 25.

To further stiffen the ring 21, it is closed to box section for substantially its entire circumference by outwardly facing channels as 40, telescoped between the front and rear plates 23 and 24 and secured to each by spot welding the plates to the respective side walls of the channels, 40. As shown in Fig. 10, the end of a channel 40 adjacent an arm 22 has its outer side wall offset to lap over the adjacent flange 28 of the arm 22. This form of joint occurs wherever one of the channels 40 has its end abutting a channel arm 22. In the case of the two arms 22 which terminate outwardly of the mounting blocks 35, the adjacent channel 40 extends across the ends thereof, and the end of these channel arms 22 are made of a depth to telescope within the sides of the channel, as 40, and these two channel arms are secured to the double thickness metal formed by the overlap of the front and rear plates 23 and 24 with the side walls of the channels 40 in these regions.

As shown in the drawings, the channel arms 22 are twisted and the channels deformed out of rectangular cross section, as required, to bring their outer flanges 28 in conformity with the curved surface contour of the shell.

At the rear, each pair of converging arms 22 are secured together and to attachment fittings for securing the mount to the firewall bulkhead 13. The attachment fittings thus provide four widely spaced points of support for the mount, two at the top and two at the bottom. The top attachment fittings of the lateral pairs of arms are similar except that they are rights and lefts with respect to the center line of the mount. It will be necessary to described but one of these.

Referring to the detail views of Figs. 21 and 24, an inner gusset plate, as 41, overlaps and is spot welded to the bottom walls 26 of the converging ends of the channel bars 22, and may be additionally secured thereto by bolts, as 29, similar to the bolts securing the arms to the ring 21. An outer gusset plate 42 overlaps the outer flanges 28 of the channel ends and is secured thereto by spot welding and by bolts, 29 and 29'. These gusset plates 41 and 42 may be flanged in their lateral margins, as shown, for greater stiffness.

A fitting, such as forging, 43, having a projecting portion formed with a transverse bolt hole and a portion telescoped between the gusset plates 41 and 42 is strongly secured thereto by a series of bolts, as 44. In the regions of the bolts 44, the plates 41 and 42 are each reinforced by a reinforcing plate, as 45.

At the bottom, as shown in the detail views of Figs. 25, 26, 27 and 28, the converging pairs of arms 22 are secured to outer and inner gusset plates 46 and 47 in a manner similar to the securement of the upper pairs of arms to the gusset plates 41 and 42, but in this case, the outer gusset plates are additionally marginally flanged at 46', these marginal flanges being conformed to the outer contour of the shell in this region and serving with the flanges 28 of the channel arms 22, of which flanges they form a continuation, for the attachment of the skin sheathing.

Each attachment fitting, as 48, at the bottom is telescoped between the gusset plates 46 and 47 and into the ends of the channel arms 22 and secured thereto through reinforcement plates 45 by bolts 44 similarly to the securement of the top fittings 43. Similarly, bolts as 29, secure the gussets 46 and 47, respectively, to the flanges 28 and the bottom walls 26 of the channels 22. The freely projecting portions of the fittings 48 each have a flat face as 49 adapted to abut the firewall 13. This flat face has a bolt hole to receive a securing bolt, for strongly securing it to the firewall, suitably reinforced in this region of securement.

With the reinforcing spider framework so constituted the skin sheathing 19 may now be readily assembled. Preferably for convenience, in making the skin sheathing of the compound curvature desired around the nose portion of the structure, as by stamping, it is formed in the sharply compound curve or dished nose region, of six separate stampings, as clearly appears in Figs. 1 and 8, the stampings being joined to each other by lap joints, as indicated at 50, and at their inner margins to the front plate 23 of the ring 21, see Fig. 9, while their rear margins form a continuous annular margin 51 extending continuously around the shell a short distance rearwardly of the in-curved nose portion of the shell. This skin sheathing 19 laps the flanges 28 of the channel arms 22 and is spot welded thereto substantially throughout to form strong box section structures therewith. At the rear fittings it laps the outer faces of the outer gussets 42 and 46 and is secured thereto. It will be seen that this combination of curved skin sheathing and internal stiffening frame arms provides a very strong, rigid construction with a minimum of weight.

Along the rear margin 51 of the curved or dished nose portion of the skin sheathing 19, it is further stiffened and the arms 22 circumferentially interbraced by hollow section, generally hat-section members 52, secured to the margin 51 through their flanges and extending between adjacent arms 22. At their ends adjoining the arms 22 the flanges of the hat-section of the members 52 are offset to overlap and be secured to the edge flanges 28 of the channel arms 22. The rigidly and permanently secured skin sheathing of the mount per se, as shown, in Fig. 6 is completed by attaching generally triangular sheet sections, one to each pair of converging arms, to the flanges 28 of the channels of the arms. These sections lap and are secured to the rear margins of the sections secured to the nose portion as shown in Fig. 20, and at their sides, see Fig. 16, extend slightly beyond the outer flanges 28 of the associated pair of arms 22.

Between the rearwardly diverging arms of adjacent pairs of arms 22, the hat-section reinforcements 52 have a flange portion 52' extending a slight distance beyond the skin sheathing 19, as shown in Fig. 17.

After the skin sheathing 19 has been applied to the framing 20 as described, a radially outer series of bolts, as 39' are applied to clamp together the arms 22, front plate 23 and sheathing 19, see Fig. 9.

The structure so far described substantially completes the load carrying structure of the mount. Where openings are formed in the mount, as at the top at 53, to receive the air intake and mixing chamber for the carburetor 16 of the engine and at the bottom, at 54, to receive the oil cooler 18, the margins of the skin sheet 19 in the opening are suitably reinforced, so that the openings have little effect upon the overall strength of the structure.

The mount so constituted, either alone, or with the engine and accessories assembled therewith may now be readily demountably secured to the firewall bulkhead 13, which may comprise an upper vertically extending wall portion, constituting the front spar 55 of the wing and a lower forwardly inclined portion forming the end bulkhead of the nacelle 12.

As shown in 4, 6 and 13, the wing spar 55 in the region of the attachment of the arms 22 of the mount thereto is strongly braced and reinforced by vertical stiffeners 56 and 56' arranged on opposite side of the web 57 thereof, these stiffeners and the web overlapping and being secured to the angle section chords 58 of the spar. The top reinforced skin sheet 59 of the wing overlaps the forwardly projecting flange of the top chord 58 of the spar 55, is secured thereto, and extends forwardly some distance therebeyond. A wing nose skin sheet 60 overlaps the forward portion of the skin sheet 59 and the top chord of the spar 55 and is secured to both.

In the angle formed by the double thickness skin sheets 59 and 60 and the reinforced web 57 of the spar 55 is secured an attachment fitting 61 securely bolted to each side of the angle so formed as by bolts 62. This bracket has spaced ears, as 63, Figs. 7 and 13, formed with aligned holes through which and the hole in the adjacent attachment fitting 43 on the mount, is passed the securing bolt as 64. Both top connections are made in this way.

At the bottom, the flat face of the bottom attachment fitting 48 on the mount is brought to rest against the reinforced web 64 of the inclined portion of the firewall bulkhead 13 in line with a strong longeron of the nacelle (not shown), and is bolted to the bulkhead by a bolt, as 65' Fig. 4. Both lower connections are similarly made.

With the mount so secured in place, it will be obvious that large openings are provided at top, sides and bottom between the four rearwardly extending mounting arms so that all parts of the interior engine accessory cowl may be readily made accessible by merely removing detachable closures for these openings. The removable closures for these openings complete the streamline contour of the mount and serve to provide the skin sheathing therefor which fairs into the wing and nacelle skin sheathing.

As shown in Figs. 1, 3, 6 and 7 the wing nose skin 60 is cut away along a line indicated in Fig. 1 by numeral 66 to permit moving the mount upwardly into the gap formed by the cut away portion to the mounting position.

As shown in Figs. 3, 7 and 18, the wing nose skin 60 at the sides of this cut away region, where it overlaps the skin sheathing 19 of mount is formed with a flange 67 overlapping the rounded sides of the engine mount skin sheet 19 and is secured thereto through this flanged margin in readily releasable fashion by screws, as 68. Finally, the opening between the diverging top arms 22 and their associated skin sheet 19, the rear margin 51 of the curved skin sheets of the dished front or nose portion of the mount and the margin of the wing nose skin sheet 60 is closed by a top cover 69 which may comprise a skin sheet 70 reinforced in its margins by a Z section member 71 having its outwardly projecting arm overlapping and secured to the margin of the skin sheet 70 of the cover 69. The cover is further reinforced as clearly appears in Figs. 7 and 17, by longitudinally extending spaced reinforcements 72 of hat-section or Z-section form. The cover 69 overlaps in its reinforced margins, at the front, the rearward extension 52' of the edge reinforcement 52, see Fig. 17; at the sides, the laterally projecting flanged margin 19' of the skin sheet 19, see Fig. 16; and at the rear, the similar margin of the top wing nose skin sheet 60, see Figs. 4 and 19, and is detachably secured in these margins by some readily detachable, but secure holding means, 73, such as the well-known Dzus-type fasteners.

The top cover is so contoured as to conform to the curvature transversely of the rest of the mount and longitudinally it merges at the center substantially into the top contour of the wing, and when secured in place, it forms a part of the overall sheathing 19 of the mount.

At the sides, as shown in Figs. 2, 4 and 6, the opening formed by the bottom contour of the wing nose sheathing 60, the front side margin of the nacelle 12 below the wing, and the top, front and bottom margins of the mount proper, is closed by a side cover or door, as 74, formed by a skin sheet 75, fabricated as shown in Figs. 2 and 7, of several longitudinally extending strips secured together in their lapped margins and curved to the contour of the mount and merging at the rear into the stream-lines of the nacelle 12. The skin sheet 75 of the cover 74 is reinforced, like the top cover, by spaced longitudinally extending reinforcements of hat or Z-section 72 secured to the skin sheet and a marginal Z-section reinforcing member 71 similarly secured to the skin sheet as the marginal member of the top cover sheet. This cover 74 has its reinforced margins overlap the adjacent reinforced margins of the mount sheet 19, the wing nose skin sheet, 60, and the lateral forward margin of the nacelle, and is secured thereto by readily detachable fasteners 73, similar to the securement of the top cover, Figs. 14 15 and 16, clearly show the manner in which this marginal joinder is made. The joinder in the front margin is similar to the securement of the top cover as shown in Fig. 17.

Since both side covers 74 are similarly constructed and secured, the description of one will suffice.

The opening 54 in the bottom of the mount to receive the oil cooler 18 extends substantially from end to end of the mount, and on each side of this opening and between it and the adjacent arm 22 is provided a removable cover 76, each of these covers 76 being also made to conform with the outer contour of the mount and nacelle and consisting of a skin sheet 77 reinforced in its margins and in its body portion similarly to the side and top covers and removably secured in place by means 73 similar to the securing means for those covers.

When the oil cooler is mounted in place the space between these covers is closed. As shown in Figs. 1 and 4, these covers 76 are gradually bulged out at 78 toward their rear edges, and are secured at their rear edges only at their opposite sides, the intermediate bulged portion 78 having its rear edge disposed radially outwardly of the adjacent front edge of the nacelle 12. Thus openings are provided, through which the closed engine mounting shell of the invention is ventilated, the rush of outside air over the bulges, serving to draw air through the openings between the rear margins of the cover and the adjacent margin of the nacelle.

As shown in Fig. 11, a baffle plate, as 79, may be secured by the engine mounting bolts 80, this baffle plate substantially closing the space between the mounting ring 21 and the engine casing so as to minimize transfer of heated air from the engine to inside of the engine mounting shell or accessory cowl. Thus, through the combined action of this baffle and the suction effect resulting from the bulges 78 on the covers 76 keeping the air in the accessory cowl changed, overheating of the accessories is effectively avoided.

While a specific form of the improved combined engine mount and accessory cowl has been herein described, it will be understood that changes and modifications may readily be made by those skilled in this art, without departing from the spirit and scope of the invention as expressed in the claims appended hereto.

What is claimed is:

1. A combined motor support and motor-accessory housing adapted to extend between the motor and the firewall of a stream-line body, such as an airplane fuselage or nacelle, comprising a sheet metal shell having its rear margin adapted to be removably secured to the firewall and its main body extended forwardly therefrom in substantial stream-line continuation of the body and its forward end turned radially inward to a marginal portion defining a central opening, said radially inturned forward end merging with the main body of the shell through curvature of substantial radius, a reinforcing ring adapted to mount a motor and secured to the marginal portion of the shell defining said opening, and generally longitudinally extending reinforcements extending between said ring and the rear margin of the shell, said longitudinally extending reinforcements conforming to the contour of the shell and secured thereto substantially throughout their extent and, at their forward ends, to the reinforcing ring the rear ends of said reinforcements being adapted for demountable securement to the body.

2. A combined support and housing according to claim 1, in which said longitudinal reinforcements are arranged in pairs, the reinforcements of a pair being secured to the reinforcing ring at circumferentially spaced points and converging toward each other toward their rear ends and secured to a common mounting element.

3. A combined support and housing according to claim 1, in which the said longitudinal reinforcements are arranged in pairs, the adjacent reinforcements of adjacent pairs diverging from their connection to the ring toward their rear ends, and the shell being provided with large openings between the rear ends of said diverging reinforcements, said openings being normally closed by readily removable covers forming, when assembled, parts of the outer shell surface.

4. A semi-monocoque combined motor supporting and motor accessory housing shell comprising a metallic skin sheet forming a main stress carrying member of the shell and conforming in its main body to a stream-line body, such as a fuselage or nacelle, of which it is adapted to form a forward extension, the sheet being formed at its forward end with a radially inwardly extending portion merging through a curved portion with the main body portion, said radially inwardly extending portion terminating in a margin defining a central opening, and a reinforcing structure for said sheet including a motor mounting ring secured thereto in the margin of said opening and longitudinally extending beams conforming to the contour of the sheet and secured thereto and to said ring the rear ends of the said beams affording means for detachably connecting the shell to a stream-line body.

5. An inner frame for a combined engine mount and accessory cowl comprising a radially outwardly presenting channel section engine mounting ring and a plurality of circumferentially arranged members each bent to the general form of a hockey stick having long and short arms, said members having their short arms telescoped within the channel section of the mounting ring aand secured thereto.

6. An inner frame for a combined engine mount and accessory cowl comprising a radially outwardly presenting channel section engine mounting ring and a plurality of spaced members, each bent to the general form of a hockey stick having long and short arms, and the short arms being telescoped within and secured to the channel section mounting ring, said members being arranged in pairs with the members of each pair secured in circumferentially spaced apart relation to the mounting ring at one of their ends, their other ends converging and secured together and to an attachment fitting.

7. A combined engine mount and accessory cowl comprising a hollow shell extending forwardly in stream-line extension of a body with which it is associated and having a forward substantially radial wall terminating inwardly in an engine mounting ring, and a baffle plate for closing the space between the ring and the casing of an engine mounted thereon to prevent the free flow of heated air from the engine to the accessories in said shell.

8. A combined engine mount and accessory cowl comprising a hollow shell extending forwardly in stream-line extension of a body upon which it is mounted and having a forward wall substantially closed when an engine is mounted in place thereon, the shell having adjacent its rear end a ventilating opening and so being formed forwardly of said opening as to cause the rush of outside air over the shell to exhaust air from the inside of the shell and thereby ventilate the shell.

9. A combined engine mount and accessory cowl comprising an inner frame including an engine mounting ring and a plurality of circumferentially arranged members each bent to the general form of a hockey stick having long and short arms, the short arms being rigidly secured to the mounting ring and the long arms extending in the same general direction away from the mounting ring, transverse members interconnecting said circumferentially arranged members in the region between their ends, and a sheet metal skin sheet covering said inner frame and secured to the members thereof.

10. A combined engine mount and accessory cowl comprising an inner frame including an engine mounting ring and a plurality of spaced generally longitudinally extending members, each bent to the general form of a hockey stick having long and short arms and the short arms rigidly secured to the mounting ring, said members being arranged in pairs with the members of each pair converging at their ends remote from the mounting ring and secured together and to an attachment fitting, a reinforcing ring interconnecting said members between their ends, and metal skin sheathing applied to all the members of said inner frame and secured thereto.

11. A combined engine mount and accessory cowl comprising a frame including an engine mounting ring and a plurality of circumferentially arranged members each bent to the general form of a hockey stick having long and short arms, the short arms being rigidly secured to said mounting ring and the long arms extending in the same general direction away from said mounting ring, and a sheet metal skin sheet covering said frame and secured to the members thereof.

12. A combined engine mount and accessory cowl comprising a frame including an engine mounting ring of hollow cross section, and a plurality of outwardly facing channel section members each bent to the general form of a hockey stick having long and short arms, the short arms being telescoped within the hollow section mounting ring and rigidly secured thereto and the long arms extending in the same general direction away from said mounting ring, and a sheet metal skin sheet covering said frame and secured to the members thereof and forming with the outwardly facing channel section members, closed box-section structures.

13. An inner frame for a combined engine mount and accessory cowl comprising a hollow-section formed-sheet-metal engine mounting ring and a plurality of circumferentially spaced hollow-section formed-sheet-metal frame members each having the general form of a hockey stick with long and short arms, said members having the ends of their short arms secured to said mounting ring and having the ends of their long arms secured to a mounting support.

MICHAEL WATTER.
GEORGE W. PANCOE.

REFERENCES CITED

The following references are of record in the file of this patent:

UNITED STATES PATENTS

| Number | Name | Date |
|---|---|---|
| 2,372,905 | McKinnie | Apr. 3, 1945 |
| 2,093,846 | Paulsen et al. | Sept. 21, 1937 |
| 2,369,077 | Seidel et al. | Feb. 6, 1945 |
| 1,705,492 | Noble | Mar. 19, 1929 |
| 1,879,632 | O'Brien | Sept. 27, 1932 |
| 2,178,998 | Scott | Nov. 7, 1939 |
| 2,158,273 | Chilton | May 16, 1939 |
| 1,383,157 | Shields | June 28, 1921 |
| 1,561,697 | Dwoitine | Nov. 17, 1925 |
| 1,344,634 | Haskell | June 29, 1920 |
| 1,541,976 | Longren | June 16, 1925 |
| 1,723,012 | Caminez | Aug. 6, 1929 |

FOREIGN PATENTS

| Number | Country | Date |
|---|---|---|
| 121,463 | Great Britain | Mar. 6, 1919 |
| 17,437 | Great Britain | 1915 |